United States Patent
Parks et al.

(10) Patent No.: US 6,197,242 B1
(45) Date of Patent: Mar. 6, 2001

(54) INJECTION MOLDING FIBERS EMBEDDED IN POLYURETHANE WITH HINDERED AMINE

(75) Inventors: Kristen L. Parks, Wexford; Frank Sanns, Jr.; Richard W. Mitesser, both of Pittsburgh; Merle W. Lesko, McDonald; Randall C. Rains, Pittsburgh, all of PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 08/261,544

(22) Filed: Jun. 17, 1994

(51) Int. Cl.[7] .................................................. B29C 45/14
(52) U.S. Cl. ...................... 264/328.1; 264/257; 264/258; 264/297.5; 264/328.1
(58) Field of Search .................................... 264/257, 258, 264/297.5, 328.1, 328.2

(56) References Cited

U.S. PATENT DOCUMENTS

| | | | |
|---|---|---|---|
| 4,146,688 | 3/1979 | Schwindt et al. | 521/159 |
| 4,218,543 | 8/1980 | Weber et al. | 521/51 |
| 4,435,349 | 3/1984 | Dominquez et al. | 264/257 |
| 4,595,742 | 6/1986 | Nalepa et al. | 528/64 |
| 4,610,835 | 9/1986 | Ghavamikia | 264/250 |
| 4,631,298 | 12/1986 | Presswood | 521/163 |
| 4,664,862 | 5/1987 | Ghavamikia | 264/257 |
| 4,781,876 | 11/1988 | Kia | 264/261 |
| 4,792,576 | 12/1988 | Nodelman | 521/174 |
| 4,798,851 * | 1/1989 | Werner et al. | 528/66 |
| 4,801,674 * | 1/1989 | Scott, Jr. et al. | 528/67 |
| 4,806,616 * | 2/1989 | Baumann et al. | 528/67 |
| 4,810,444 | 3/1989 | Alberino et al. | 264/102 |
| 4,871,789 | 10/1989 | Martinez | 523/220 |
| 4,952,358 | 8/1990 | Okina et al. | 264/134 |
| 4,957,684 | 9/1990 | Kia | 264/257 |
| 5,009,821 | 4/1991 | Weaver | 264/22 |
| 5,059,634 | 10/1991 | Smith | 521/167 |
| 5,106,874 * | 4/1992 | Porter et al. | 528/64 |
| 5,124,426 * | 6/1992 | Primeaux, II et al. | 528/60 |
| 5,204,170 * | 4/1993 | Koyzin | 428/225 |
| 5,350,778 * | 9/1994 | Steppan et al. | 528/67 |
| 5,391,344 * | 2/1995 | Rains et al. | 264/257 |
| 5,418,260 * | 5/1995 | Smith | 528/60 |

* cited by examiner

*Primary Examiner*—Robert E. L. Sellers
(74) *Attorney, Agent, or Firm*—Joseph C. Gil; N. Denise Brown

(57) ABSTRACT

The invention is directed to a process for preparing a Class-A surface, fiber reinforced molded article. The process broadly requires the use of two separate fiber surfacing veils with a fiber reinforcement sandwiched therebetween. A polyurethane reaction system is injected into the mold. The system requires the presence of specified hindered amines.

9 Claims, No Drawings

INJECTION MOLDING FIBERS EMBEDDED IN POLYURETHANE WITH HINDERED AMINE

BACKGROUND OF THE INVENTION

Reaction injection molding (RIM) has become an important process for the manufacture of a wide variety of moldings. The RIM process is a process which involves the intimate mixing of a polyisocyanate component and an isocyanate-reactive component followed by the injection (generally under high pressure) of the mixture into a mold with subsequent rapid curing. U.S. Pat. No. 4,218,543 describes one particularly commercially significant RIM system, which requires the use of a specific type of aromatic amine as a crosslinker/chain extender. The preferred amine described in the '543 patent is diethyl toluene diamine (DETDA).

In the automotive industry, the application of RIM technology has been primarily to produce vertical parts (e.g. fenders and fascias) and has typically not been used in the production of horizontal body parts (e.g., trunks, hoods and roofs). In order to be useful for the production of horizontal body parts, the molded product 1) must have high stiffness, 2) must have a high quality surface, and 3) must be able to withstand the heat generated during further processing of the part (e.g., painting and curing the paint). Typically, such a part must have a flexural modulus of 750,000 psi or higher.

Fiber glass reinforcement of polyurethane RIM parts is known. See, e.g., U.S. Pat. Nos. 4,435,349, 4,792,576, and 4,871,789. When utilizing such fiber glass reinforcement, several problems are generally encountered, not the least of which is the production of a smooth surface (see, e.g., U.S. Pat. Nos. 4,610,835, 4,644,862, 4,781,876, 4,810,444, 4,952,358, 4,957,684, and 5,009,821).

Recently, a process was developed for preparing Class A surface, fiber-reinforced molded articles (U.S. Pat. No. 5,391,344 issued on Feb. 21, 1995, based on U.S. application Ser. No. 159,891, filed on Dec. 1, 1993 which is a Continuation-in-Part of U.S. patent application Ser. No. 07/798,479, filed on Nov. 26, 1991 now abandoned). The process broadly comprised injecting a specific formulation into a mold, allowing the formulation to fully react and removing the molded part from the mold. The formulation broadly required the use of a polymethylene poly(phenyl isocyanate) and a mixture of hydroxyl functional materials. While adequate for many applications, the formulation tended to blister after being subjected to further heat treatment at 150° C. (which is typical for curing of the paint).

Hindered amines are known for a variety of use in the polyurethane art (see, e.g., U.S. Pat. Nos. 4,146,688, 4,595,742, 4,631,298 and 5,059,634).

DESCRIPTION OF THE INVENTION

The present invention is directed to an improved process for preparing a Class A surface, fiber reinforced molded article which has excellent high temperature properties and which exhibits little or no blistering when subjected to temperatures as high as 180° C. The process can be used to produce horizontal, as well as vertical, automotive parts. The improved process comprises:

(A) providing a mold, having a cavity therein for forming the fiber reinforced molded article, wherein at least a portion of the mold cavity defines a mold cavity surface against surface the article is to be molded, (B) laying one or more fiber surfacing veils against the mold cavity surface, (C) laying one or more layers of fiber reinforcing mat over said surfacing veil, (D) laying one or more fiber surfacing veils over said fiber mat, (E) closing the mold, (F) injecting a reaction mixture via the RIM process into said mold cavity, (G) allowing the reaction mixture to fully react, and removing the resultant molded product from the mold, the improvement wherein said reaction mixture comprises (1) one or more polymethylene poly(phenyl isocyanates) (i) having a diisocyanate content of from 25 to less than 50% by weight, (ii) containing less than 2% by weight of 2,4'-methylene bis(phenyl isocyanate), and (iii) containing less than 0.5% by weight of 2,2'-methylene bis(phenyl isocyanate), and (2) a blend of active hydrogen containing compounds comprising:

(a) at least one polyether polyol having an hydroxyl functionality of from 2 to 8 and a molecular weight of from 350 to below 1800, (b) at least one hydroxyl functional organic material containing from 2 to 8 hydroxyl groups and having a molecular weight below 350, components (a) and (b) being used in a weight ratio of from about 10:1 to about 1:10, (c) no more than 45% by weight based on the total weight of components (a), (b), and (c), of one or more active hydrogen containing compounds having a molecular weight of 1800 or more, and (d) from about 20% to about 40% by weight, based upon the total weight of components (a), (b), (c) and (d) of one or more hindered amines of the formula:

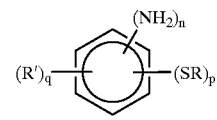

(I)

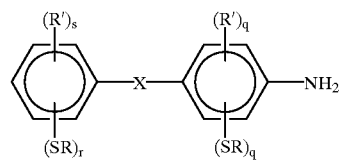

(II)

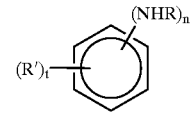

(III)

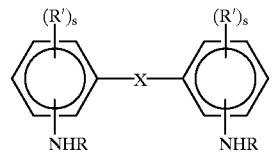

(IV)

where each R may be the same or different and represents an alkyl group, preferably of from 1 to 20 carbon atoms and most preferably from 1 to 6 carbon atoms, each R' may be the same or different and represents H or any substituent which does not adversely affect polyurethane formation, more preferably an alkyl group of from 1 to 6 carbon atoms or H, n=2 or 3, preferably 2,
p=2 or 3, preferably 2,
q=0 to 2,
r=0 to 4,
s=0 to 5,
t=3 or 4, and
X is an alkylene or alkylidene, with the amounts of components (1) and (2) being such that the isocyanate index is from about 70 to about 130.

The mold cavity surface preferably has an SPI-SPE polished rating of at least 3. Furthermore, the surfacing veils are preferably glass fiber veils. In each of steps (B) and (D), the amount of veil used is preferably at least 0.1 kilogram per square meter. In addition, the amount of reinforcing mat is preferably at least 0.5, and most preferably at least 1.0, kilograms per square meter. The total amount of surfacing veils and reinforcing mat is preferably such that the total amount of fiber in the molded article is from 15 to 45% by weight, and most preferably from 20 to 35% by weight, based upon the total weight of the molded product. When the reaction mixture is introduced into the mold, it fills the mold cavity, simultaneously impregnates the reinforcing mat and deforms the veil into intimate contact with the mold cavity surface.

In general, the final thickness of the molded part is no thicker than 120 thousands of an inch. The surface of the part is a Class A surface, and the flexural modulus of the part is in excess of about 5.16 GPa (i.e., in excess of about 750,000 psi). Finally, the part is able to withstand heat over a broad range of temperatures up to about 180° C.

The components (i.e., (1) and(2)) useful herein are known in the art. The isocyanates, the hydroxy functional materials and the relatively high molecular weight active hydrogen containing materials are described in U.S. Pat. No. 4,792,576, the disclosure of which is herein incorporated by reference.

Starting polyisocyanate components (1) suitable for use in the present invention are polymethylene poly(phenyl isocyanates) (i) having a diisocyanate content of from 25 to less than 50% by weight, (ii) containing less than 2% by weight of 2,4'-methylene bis(phenyl isocyanate), and (iii) containing less than 0.5% by weight of 2,2'-methylene bis(phenyl isocyanate). The isocyanates generally have isocyanate group contents of from 25 to 35% by weight, and preferably from 27 to 32% by weight.

The blend of active hydrogen containing compounds (2) used according to the present invention must include (a) a polyether polyol having a molecular weight of from 350 to below 1800 and (b) a polyhydroxy material having a molecular weight below 350, and may include (c) up to 45% by weight of one or more active hydrogen containing compounds having molecular weights of more than 1800 and having functionalities of 2 to 8.

Polyethers having molecular weights of from 350 to below 1800 containing two to four hydroxy groups are preferred as component (2)(a).

Useful polyethers are known and are obtained, for example, by the polymerization of epoxides, such as ethylene oxide, propylene oxide, butylene oxide, tetrahydrofuran, styrene oxide or epichlorohydrin alone, for example in the presence of $BF_3$, or by the chemical addition of these epoxides, optionally in admixture with or in succession to starter components having reactive hydrogen atoms. Such starter compounds include water, alcohols, or amines, such as ethylene glycol, 1,3- or 1,2-propylene glycol, trimethylol propane glycerine, 4,4'-dihydroxy diphenyl propane, aniline, ammonia, ethanolamine and ethylene diamine.

Compounds containing at least two hydroxyl groups and having molecular weights of below 350 are also used in the present invention ((2)(b)). These materials preferably contain 2 or 3 hydroxyl groups. Mixtures of different compounds containing at least two hydroxyl groups and having molecular weight of less than 350 may also be used. Examples of such low molecular weight compounds are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis- hydroxy-methyl cyclohexane, 2-methyl, 3-propane diol, dibromobutene diol (U.S. Pat. No. 3,723,392), glycerol, trimethylol propane, 1,2,6-hexane triol, trimethylol ethane, pentaerythritol, quinitol, mannitol, sorbitol, diethylene glycol, triethylene glycol, tetraethylene glycol, higher polyethylene glycols having molecular weights of less than 350, dipropylene glycol, higher polypropylene glycols having molecular weights of less than 350, dibutylene glycol, higher polybutylene glycols having a molecular weight of less than 400, 4,4'-dihydroxy diphenyl propane, dihydroxy methyl hydroquinone, and the like.

Other low molecular weight polyols having a molecular weight of less than 350 which may be used in accordance with the present invention include ester diols, diol urethanes and diol ureas of the type described in U.S. Pat. No. 4,972,576, the disclosure of which is herein incorporated by reference.

For certain purposes, it may be advantageous to use polyols containing sulfonate and/or phosphonate groups (German Offenlegungsschrift 2,719,372), such as the adduct of bisulfite with 1,4-butene diol or the alkoxylation product thereof.

The higher molecular weight, isocyanate reactive materials useful herein (component (2)(c)) are known in the polyurethane art and include hydroxyl containing materials as well as amine functional materials. Preferred are relatively high molecular weight polyethers having molecular weights of above 1800 and having hydroxyl functionalities of from 2 to 4.

The key to the present invention resides in using the hindered amine. These hindered amines are known and are described in U.S. Pat. Nos. 4,146,688, 4,595,742, 4,631,298 and 5,059,634, the disclosures of which are herein incorporated by reference. The presently preferred amines are commercially available and sold as Ethacure 300 from Ethyl Corporation (a mixture of 3,5-dimethylthio-2,4-toluene diamine and 3,5-diethylthio-2,6-toluene diamine); Unilink 4100 available from UOP (an amine of the formula (III) where R' is H, n is 2, and R is butyl, with the NHR groups being present in the 1 and 3 positions); and Unilink 4200 available from UOP (an amine of the formula (IV) where R' is H, and R is butyl). Other specific diamines are described in the patents noted.

The fiber surfacing veils useful herein are generally commercially available. As is known, surfacing veils (or mats) are generally highly filamentized polyester or fiberglass, used primarily to produce a smooth surface on a reinforced plastic laminate. Polyester fiber surfacing veils are generally not preferred since they tend to be more expensive than fiberglass veils and since they tend to shift during molding. Accordingly, it is preferred to use glass fiber surfacing veils. Suitable commercial glass fiber surfacing veils include Surmat SF 100, available from Nicofibers, Schmeizer Industries veil, available from GLS Fiberglass, Viledon glass veils, available from Freudenberg. It is preferred that the surfacing veil be used in an amount of at least 0.1 kilogram per square meter. Depending upon the weight of the particular veil chosen, more than one sheet of veil may have to be used in order to reach the preferred weight. The upper limit is generally set by economic considerations. The surfacing veil should be placed on the mold surface and substantially the same amount should be placed on the reinforcing mat. It is most preferred that exactly the same weight of veil be placed on the mold surface and on the reinforcing mat, since if substantially different weights are used, part warpage may result.

The reinforcing mats useful in this invention comprise glass mats, graphite mats, polyester mats, polyaramid mats such as KELVAR mats and mats made from any fibrous material. The preferred glass mats are continuous glass strand mats of the type generally used in producing reinforced RIM parts. Typical useful mats are described in the examples set forth in U.S. Pat. No. 4,792,576. Although the mats used in the examples of the present invention are random continuous strand mats made of glass fiber bundles, woven mats and oriented mats such as uniaxial or triaxial mats may also be used. Depending upon the weight of the particular reinforcing mat chosen, more than one sheet of mat may have to be used in order to reach the required weight.

Catalysts may also be used in the invention. Suitable catalysts include those known per se, for example tertiary amines such as triethylamine, tributylamine, N-methylmorpholine, N-ethylmorpholine, N-cocomorpholine, N,N,N',N'-tetramethyl-ethylene diamine, 1,4-diazabicyclo-(2,2,2)-octane, N-methyl-N'-dimethylaminoethyl piperazine, N,N-dimethylbenzylamine, bis-(N,N-diethylaminoethyl)-adipate, N,N-diethylbenzylamine, pentamethyldiethylene triamine, N,N-dimethylcyclohexyl-amine, N,N,N',N'-tetramethyl-1,3-butane diamine, N,N-dimethyl-β-phenyl-ethylamine, 1,2-dimethyl-imidazole and 2-methylimidazole.

Examples of tertiary amines containing hydrogen atoms capable of reacting with isocyanate groups are triethanolamine, triisopropanolamine, N-methyldiethanolamine, N-ethyldiethanolamine, N,N-dimethyl-ethanolamine and their reaction products with alkylene oxides, such as propylene oxide and/or ethylene oxide.

Other suitable catalysts are silaamines having carbon silicon bonds of the kind described in German Pat. No. 1,229,290. These include 2,2,4-trimethyl-2-silamorpholine and 1,3-diethylaminomethyl tetramethyl disiloxane.

Nitrogen-containing bases such as tetraalkyl ammonium hydroxides; alkali hydroxides such as sodium hydroxide; alkali phenolates such as sodium phenolate; alkali alcoholates such as sodium methylate, and hexahydrotriazines may also be used as catalysts.

Organometallic compounds especially organotin compounds may also be used as catalysts. Preferred organotin compounds include tin-(II)-salts of carboxylic acids, such as tin-(II)-acetate, tin-(II)-octoate, tin-(II)-ethylhexoate and tin-(II)-laurate and the dialkyl tin salts of carboxylic acids such as dibutyl tin diacetate, dibutyl tin dilaurate, dibutyl tin maleate or dioctyl tin diacetate.

Further examples of suitable catalysts and details on the way in which the catalysts work can be found in Kunststoff-Handbuch, Vol. VII, published by Vieweg and Hochtlen, Carl-Hanser-Verlag, Munich 1966 page 96–102.

The catalysts are generally used in quantities of from about 0.001 to 10% by weight, based on the quantity of isocyanate reactive compounds.

Surface-active additives can also be used. Examples of emulsifiers are the sodium salts of castor oil sulphonates or even of fatty acids or salts of fatty acids with amines such as diethylamine oleate or diethanolamine stearate. Alkali or ammonium salts of sulphonic acids, such as those of dodecylbenzene sulphonic acid or dinaphthylmethane disulphonic acid or even of fatty acids, such as ricinoleic acid, or of polymeric fatty acids, can also be used as surface-active additives.

It is also possible to use reaction retarders, for example, substances with an acid reaction such as hydrochloric acid or organic acid halides. Pigments or dyes and flameproofing agents known per se, such as tris-chloroethyl phosphate or ammonium phosphate and polyphosphate and Mobil's Antiblaze 19 flame retardant may be used. Stabilizers against the effects of aging and weather, plasticizers and substances with fungistatic and bacteriostatic effects, and fillers such as mica, barium sulphate, kieselguhr, carbon black or prepared chalk may also be used.

It is also preferred that so-called external and/or internal mold release agents be used. Suitable internal mold release agents include those described in U.S. Pat. No. 4,585,803, 4,581,386 and 4,519,965, the disclosures of which are herein incorporated by reference. Also useful are those internal mold release agents described in German Offenlegungsschriften 1,953,637 and 2,121,670. One particularly preferred mold release is a mixture of Silicone DC-193 (available from Dow Corning) and the adduct formed by reacting one mole of N,N'-dimethylpropylamine with two moles of tall oil.

The invention is further illustrated but is not intended to be limited by the following examples in which all parts and percentages are by weight unless otherwise specified.

EXAMPLES

The mold used was a Fiero hood outer tool, having an SPI-SPE polished rating of between 1 and 2 (as is known in the art, the lower the number, the more highly polished is the mold, with a rating of 1 and 2 being more polished than a rating of 3), and used to manufacture SMC parts. The 1.9 square meter mold was converted for reaction injection molding ("RIM") by installing a center-gated injection port, removing excess SMC heating lines, and cutting vents into the regions of the mold where air could be entrapped. During molding, the mold temperature was about 82° C.

The Fiero hood mold was installed on a production scale Cannon 600 ton press with 2.4 meter by 3.0 meter platens. The mold was installed so that the Class-A surface was placed on the cavity side or lower half and the bonding or no-show surface was placed on the core side or upper half of the mold. A Hennecke HS-3000 metering unit with an approximate throughput range of 0.5 to 3.6 kg/sec and a maximum shot size of 25 kg was used to inject the polyol and isocyanate.

The types of reinforcement mats used were continuous glass fiber strand mats (Owens-Corning Fiberglass M8610). One sheet of fine glass fiber (17 micron) surfacing veil (Nicofiber Surmat SF-100) was placed on the Class-A surface and one sheet of a veil of the same type and weight was placed on top of the continuous strand mat.

The glass mats were rough-cut by hand and then final cut using the shear edge on the mold. Typical throughputs for the Fiero hood outer were 1.4 kg/sec. This allowed a shot time of about 3 seconds. Reaction was complete for this part in about 90 seconds. As the chemicals were being injected, the mold was first approximately 3 mm open, and was brought fully closed upon completion of the shot. This is done to lessen air entrapment at the extremities of the part. The chemicals were kept at 30° C. prior to injecting. The actual in-mold pressures at the glass loadings examined were approximately 1.7 mPa. The mixing pressures were about 17.9 mPa for the polyol side and about 17.2 mPa for the isocyanate side. External mold releases were applied to the mold surface to aid release.

The resultant full size Fiero hoods were painted at a molder's production painting facility. The high temperature limit on the production paint-bake ovens was 160° C. Some of the parts were post-cured at a temperature of 120° C. for 1 hour to assess the effect of this treatment on paintability and physical properties. A post-cure of this type may be necessary if the parts are subjected to a delay between molding and painting. The samples were measured for distinctness of image (DOI) and surface waviness (Ashland Index) using a LORIA surface analysis system.

Physical properties were obtained from plaques cut from flat center portions of the SRIM Fiero hoods. Samples were tested for flexural modulus (ASTM D-790), density (ASTM D-792), and heat distortion (ASTM D-648). The weight glass was determined by burning off the resin from a sample of the final molded composite.

6) SF100: a surfacing veil available from Nicofibers in a variety of weights.
7) FILLER A: a KMG mineral Himod 450-sm-lv mica. This is a surface-treated mica for low viscosity.
8) FILLER B: a Cyprus Industrial Mineral mistron vapor-R talc. This talc has a diameter of 1.7 micron and a fineness of 5.5 Hegman.
9) MOLD RELEASE: CT-2006: a naphtha based wax emulsion commercially available from Chemtrend.

The various formulations and materials were as set forth in Table 1. The catalyst noted was mixed with the polyol blend. Both CAT A and CAT B were added in amounts of 0.5 parts by weight per 100 parts of polyol blend. The weight ratios of isocyanate to polyol blend (where the blend included the catalyst) were as follows: Examples 1 through 4: 124:100

| Example | Filler | Surface Veil | Reinforcement | Postcure |
|---|---|---|---|---|
| 1 | B | 0.1 kg/m$^2$ | 1.2 kg/m$^2$ | 120° C./1 Hr. |
| 2 | A | 0.1 kg/m$^2$ | 1.2 kg/m$^2$ | 120° C./1 Hr. |
| 3 | B | 0.1 kg/m$^2$ | 1.2 kg/m$^2$ | none |
| 4 | A | 0.1 kg/m$^2$ | 1.2 kg/m$^2$ | none |

| Example | Glass wt. % | Filler wt. % | Flex. Mod. (GPa) | Density (g/cm$^3$) | Heat Dist. T (° C.) | Thickness (mm) | DOI | Ashland Index |
|---|---|---|---|---|---|---|---|---|
| 1 | 28 | 10 | 7.81 | 1.52 | 201 | 3.0 | 90 | 120 |
| 2 | 28 | 15 | 8.30 | 1.59 | 211 | 3.0 | 90 | 120 |
| 3 | 28 | 5 | 6.89 | 1.47 | 200 | 3.0 | 90 | 120 |
| 4 | 28 | 10 | 7.58 | 1.55 | 205 | 3.0 | 90 | 120 |

The following materials were used in the examples:
1) POLYOL BLEND: a mixture of
   i) 30 parts by weight of a polyoxypropylene diol adduct having a molecular weight of about 425,
   ii) 30 parts by weight of Ethacure 300: a mixture of 3,5-dimethylthio-2,4-toluenediamine and 3,5-dimethylthio-2,6-toluenediamine; commercially available from Ethyl Corporation,
   iii) 20 parts by weight of a 356 molecular weight adduct of ethylene diamine and propylene oxide, and
   iv) 20 parts by weight of a 240 molecular weight adduct of mono-ethanolamine and propylene oxide
2) CAT A: triethylenediamine, sold as Dabco 33LV by Air Products.
3) CAT B: SA 610–50, available from Air Products. 1,5-diazabicyclo-5.4.0-undec-5-ene.
4) ISO: a polymethylene poly(phenyl isocyanate), having a diisocyanate content of 44 by weight, containing 1.6% by weight of 2,4'-methylene bis(phenyl isocyanate) and 42.4% by weight of, 4,4'-methylene bis(phenyl isocyanate). The isocyanate has an isocyanate group content of 32 by weight and a viscosity at 25° C. of 180 mPa.s.
5) M8610: a continuous strand fiberglass mat available from Owens Corning Fiberglas. The mats are available in a variety of weights per square foot. Each mat used in the examples weighed 0.6 kg/m$^2$, and two sheets of mat were used in each example to provide a total reinforcement weight of 1.2 kg/m$^2$.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for preparing a Class A surface, fiber reinforced molded article comprising
   (A) providing a mold, having a cavity therein for forming the fiber reinforced molded article, wherein at least a portion of the mold cavity defines a mold cavity surface against surface the article is to be molded,
   (B) laying one or more fiber surfacing veils against the mold cavity surface,
   (C) laying one or more layers of fiber reinforcing mat over said surfacing veil,
   (D) laying one or more fiber surfacing veils over said fiber mat,
   (E) closing the mold,
   (F) injecting a reaction mixture via the RIM process into said mold cavity,
   (G) allowing the reaction mixture to fully react, and removing the resultant molded product from the mold, the improvement wherein said reaction mixture comprises
      (1) one or more polymethylene poly(phenyl isocyanates) (i) having a diisocyanate content of from 25 to less than 50% by weight, (ii) containing less than 2% by weight of 2,4'-methylene bis(phenyl isocyanate), and (iii) containing less than 0.5% by weight of 2,2'-methylene bis(phenyl isocyanate), and
(2) a blend of active hydrogen containing compounds comprising:
(a) at least one polyether polyol having an hydroxyl functionality of from 2 to 8 and a molecular weight of from 350 to below 1800,
(b) at least one hydroxyl functional organic material containing from 2 to 8 hydroxyl groups and having a molecular weight below 350, components (a) and (b) being used in a weight ratio of from about 10:1 to about 1:10,
(c) no more than 45% by weight based on the total weight of components (a), (b), and (c), of one or more active hydrogen containing compounds having a molecular weight of 1800 or more, and
(d) from about 20% to about 40% by weight, based upon the total weight of components (a), (b), (c) and (d) of one or more hindered amines of the formula:

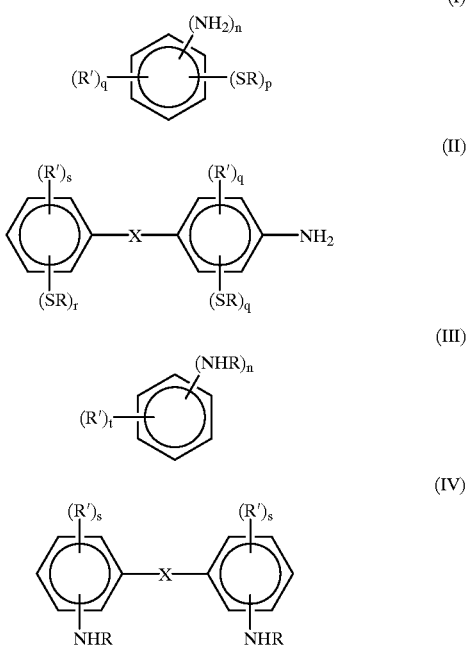

where each R may be the same or different and represents an alkyl group,
each R' may be the same or different and represents H or any substituent which does not adversely affect polyurethane formation,
n=2 or 3,
p=2 or 3,
q=0 to 2,
r=0 to 4,
s=0 to 5,
t=3 or 4, and
X is an alkylene or alkylidene,
with the amounts of components (1) and (2) being such that the isocyanate index is from about 70 to about 130.

2. The process of claim 1, wherein
each R represents an alkyl group of from 1 to 20 carbon atoms,
each R' represents an alkyl group of from 1 to 6 carbon atoms or H,
n=2, and
p=2,
within the formula of said hindered amines.

3. The process of claim 2, wherein:
each R represents an alkyl group of from 1 to 6 carbon atoms within the formula of said hindered amines.

4. The process of claim 1, wherein said surfacing veil comprises one or more glass fiber surfacing veils.

5. The process of claim 4, wherein said surfacing veil is present in an amount of at least 0.1 kg/m².

6. The process of claim 1, wherein said reinforcing mat comprises one or more continuous glass strand mats.

7. The process of claim 6, wherein said reinforcing mat is present in an amount of 0.5 kg/m².

8. The process of claim 1, wherein the total amount of surfacing veils and reinforcing mats is such that the total amount of fiber in the molded article is from 15 to 45% by weight, based on the total weight of the molded product.

9. The process of claim 1, wherein said hindered amines are selected from the group consisting of (i) a mixture of 3,5-dimethylthio-2,4-toluene diamine and 3,5-dimethylthio-2,6-toluene diamine, (ii) an amine corresponding to the formula:

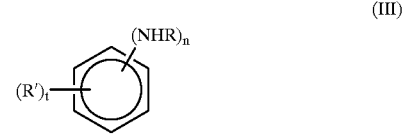

wherein:
R' represents H,
R represents butyl, and
n=2
with the NHR groups being in positions 1 and 3;
(iii) an amine corresponding to the formula:

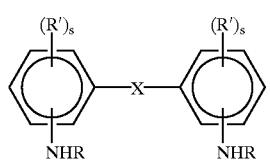

wherein:
R' represents H, and
R represents butyl;
and (iv) mixtures thereof.

* * * * *